United States Patent Office

2,820,820
Patented Jan. 21, 1958

2,820,820

METHOD FOR OXIDIZING GLUTARALDEHYDES

Amelio E. Montagna and Everett R. Lashley, Jr., South Charleston, W. Va., assignors to Union Carbide Corporation, a corporation of New York No Drawing. Application January 5, 1956
Serial No. 557,456

13 Claims. (Cl. 260—530)

This invention relates to oxidation processes. It is more particularly concerned with an improvement in processes for making oxidation products from glutaraldehydes, including glutaraldehyde and alkyl-substituted glutaraldehydes. It includes also a method of producing glutaric acids, anhydrides, and esters of a high degree of purity. As used herein the term glutaric acids includes unsubstituted glutaric acid and alkyl-substituted glutaric acids containing a total of up to 12 carbon atoms, and the term glutaraldehydes includes the corresponding unsubstituted and substituted glutaraldehydes.

Glutaric acids and their anhydrides have not heretofore been readily produceable on a commercial scale. The next higher homolog of glutaric acid, adipic acid, has been available commercially and its derivatives have found wide and valuable application in the production of plasticizers, synthetic fibers including nylon, insect repellants and synthetic lubricants, but it does not appear that the utility of derivatives of glutaric acids has been similarly explored. However, we are aware that as plasticizers, polyesters made from glutaric acids and polyhydric alcohols impart excellent low temperature characteristics to resin-plasticizer compositions. For instance, the polyesters made from glutaric acids or glutaric anhydrides and 1,5-pentanediols are plasticizers for vinyl-type polymers, and the plasticized resins have many useful properties including unexpectedly and unpredictably superior low temperature performance.

A practicable method for the production of glutaric acids and substituted glutaric acids or their anhydrides has long been sought for. The first preparation of glutaric acid involved the hydrolysis of trimethylene cyanide (Reboul. comp. rend. (1876), vol. 82; 1197). This method was improved by Marvel and Turley (Organic Synthesis (1925) vol. 5; 69). Perkins (Ber. (1886) vol. 19; 1053–1057), prepared the acid from methylene dimalonic ester, the condensation product of formaldehyde and two moles of malonic ester. The tetra ester was hydrolyzed and decarboxylated to form glutaric acid. This procedure was modified by other workers including Knoevanagel (Ber. (1894) vol. 27; 2346), Gault (Bull. Soc. Chem. (1912) vol. 11; 380–382), Otterbach (Organic Syntheses (1930), vol. 10; 58–59). A similar reaction recently developed involved the condensation of acrylonitrile with malonic esters followed by hydrolysis and subsequent decarboxylation (Hesse and Bucking, Ann. (1949) vol. 563, 31–37) Mikeska, Patent 2,461,336).

Glutaric acid was made by Markownikow (Ber. (1900), vol. 33; 1909) by the oxidation of methylcyclopentane with nitric acid. It was made also by Fleming (Patent No. 2,452,741) and Cavanaugh and Nagle (Patent No. 2,343,534) by the oxidation of cyclopentane and cyclohexane with nitric acid. Herr (Petroleum (1910) vol. 5; 692) reported that naphthenes from petroleum were oxidized with nitric acid to produce glutaric acid. Nelles, in Patent No. 2,168,844 disclosed that glutaric acid was produced by oxidizing methyl cyclohexane in the vapor phase over a vanadium oxide catalyst. Kerosene, decalin and butyl decalin all yielded glutaric acid upon oxidation with nitric acid according to Zal'kind and Khuskivadge (J. Applied Chem. U. S. S. R. (1941), vol. 14, 405–409; translated in Foreign Petroleum Tech. (1941) vol. 9; 444–452). Cyclopentene was converted by Harries and Frank (Ber. (1908) vol. 41; 1701–1711) to an ozonide which was decomposed to glutaric acid.

Cyclopentanone was oxidized with nitric acid to form glutaric acid (Hentzchel and Wislicenus, Ann. (1893) vol. 275; 315; McAllister Patent No. 2,286,559). Cyclopentanone was oxidized also with oxygen or air (Fleming and Speer Patent No. 2,005,183) to make glutaric acid. McAllister (Patent No. 2,193,562) described a process for the production of glutaric acid by the oxidation of cyclopentanol with nitric acid. Crude hydrogenated phenols and cresols were oxidized by Claasen (Fr. Patent No. 32,991) to a mixture of acids including glutaric acid.

A somewhat unusual preparation was the fusion of tetrahydrofurfuryl alcohol with caustic soda to form the sodium salt of glutaric acid (Park and Alsfield, Ger. Patent 725,741). Pummerer and Schonamsgruber (Ber. (1938) vol. 72B; 1842) reported that glutaric acid was obtained in 80 percent yield when 1,5-pentanediol was oxidized with alkaline permanganate. Glutaric acid was obtained also when 5-hydroxy-pentanal (5-hydroxy valeraldehyde) was oxidized with nitric acid (Bremmer, et al. Patent No. 2,389,950; English and Dayan, Organic Syntheses (1950) vol. 30; 48–50). Glutaric acid was produced also upon the oxidation of 2-hydroxy-adipaldehyde with oxygen in the presence of a cobalt acetate-zinc chloride catalyst (U. S. O. P. B. 73,715, frames 6289–6290 (1942); U. S. 2,513,766).

Glutaric anhydride was prepared for the first time when Markownikoff (Ber. (1877) vol. 10; 1103) heated the silver salt of glutaric acid with acetyl chloride in ether solution. The anhydride was formed also by Markownikoff by refluxing glutaric acid at a temperature of 190° C. and at an absolute pressure of 10 millimeters of mercury for a period of two to three hours. Glutaric anhydride was also formed by Voerman (Recueil des Travaux de Pays Bas (1904), vol. 23; 267) by the action of phosphorus pentachloride on the acid and by Mol (Rec. des trav. chem. de Pays Bas (1907) vol. 26; 381) by the action of acetyl chloride on the acid.

None of these procedures, however, constitutes a commercially feasible process for a variety of reasons, including among others, low yield, costly reactants, corrosive reactants, requiring expensive equipment and the like. In view of the availability of glutaraldehydes as low-cost starting materials, a practical process for the production of glutaric acids by the oxidation of glutaraldehydes would be of great value. We have found, however, that the direct oxidation of glutaraldehydes with molecular oxygen by conventional methods is particularly difficult and the direct oxidation of refined glutaraldehydes, undiluted or in the presence of most inert solvents, results in the polymerization of the aldehyde.

We have now discovered a method, however, by which glutaraldehydes may be readily oxidized with molecular oxygen, in a commercially feasible process with good yields. According to our process, the glutaraldehydes are oxidized with molecular oxygen using an oxidation catalyst, preferably a metal compound, in the presence of a lower aliphatic mono-carboxylic acid, such as acetic acid, propionic acid or butyric acid as solvent. We have found acetic acid to be the preferred solvent. It is essential to our process that the acid constitute at least 10 percent by weight of the total charge. If the aldehyde is essentially anhydrous, the mono-carboxylic acid is the only solvent required, although various inert solvents may also be present. If water or an inert solvent is present, sufficient acid must be added so as to constitute from 10 to 50 percent by weight of the total charge. The aldehyde concentration may be as low as 10 percent or as high as 50 percent by weight of the charge. Part or all of the acid may be charged as the corresponding anhydride if desired.

The preferred reaction temperature is from 20 to 50° C., although temperatures as low as 10° C. and as high as 110° C. are operative. For best results the temperature during the reaction must not exceed 110° C. Above this temperature tarry oxidation products tend to form, lowering the efficiency of the oxidation process. At temperatures below 0° C. the oxidation rate is too slow to be practicable. Addition of molecular oxygen and agitation of the reaction mixture are continued until an exothermic reaction is no longer observed.

The molecular oxygen can be introduced into the reaction mixture by known expedients, as for instance, by means of a diffuser. As a source of molecular oxygen, air or pure oxygen, or mixtures of oxygen and inert gases may be used. Air has the advantage of being the least expensive while substantially pure oxygen has the advantage of effecting the oxidation reaction at atmospheric pressure and does not require the use of a pressure vessel. In using air it is desirable to employ a pressure somewhat above atmospheric pressure in order to increase the solubility of the oxygen from the air in the reaction medium. A pressure of from about 50 to about 150 pounds per square inch gauge is preferred. At pressures much above this it is necessary to use expensive high pressure equipment and the added benefit is not appreciable. The agitation of the reaction liquid created by blowing in the oxygen in the form of air aids in distributing the oxygen properly and also promotes better heat transfer for disposal of the heat of reaction.

The oxidation of glutaraldehyde is preferably carried out in the presence of a metal compound as catalyst, which compound must of course be soluble in the reaction mixture. Catalysts which may be employed include various compounds of cobalt, copper, manganese, vanadium or other suitable metals known to be oxidation catalysts, either separately or in combination with one another, or with other metallic compounds. Regardless of the form in which they are introduced, these compounds may be converted during the reaction to the salts of the acids contained in the reaction mixture. Both organic and inorganic metal compounds have been found useful and equally effective on the basis of their metal content. Metal compounds suitable for use as catalysts in the invention include the metal acetates, carbonates, oxides, hydroxides, glutarates, butyrates, naphthenates, 2-ethylhexanoates and the like, as well as other compounds such as ammonium metavandates and the like. Combinations of two metal compounds such as cobalt and copper may be used advantageously.

The quantity of catalyst employed is not narrowly critical. A catalyst concentration of as low as 0.001 part or as high as 5 parts per 100 parts by weight of the total charge may be employed with satisfactory results. The preferred catalyst concentration is from about 0.002 to about 1.0 percent by weight of the reaction mixture.

Our invention is directed to making the oxidation products of a number of glutaraldehydes, including unsubstituted glutaraldehyde, as well as alkyl substituted glutaraldehydes containing up to a total of 12 carbon atoms. These glutaraldehydes include those which can be prepared by the hydrolysis of 2-alkoxy-3,4-dihydro-1,2-pyran and its alkyl derivatives. Typical of such alkyl-substituted glutaraldehydes are 3-methylglutaraldehyde; 2-ethyl-glutaraldehyde; 2-butylglutaraldehyde; 2-hexylglutaraldehyde; 2,4-dimethylglutaraldehyde; 2-methyl-4-butylglutaraldehyde; 2-butyl-3-methylglutaraldehyde; 3-propylglutaraldehyde; 2-butyl-3-propylglutaraldehyde; 2,3-dimethylglutaraldehyde; 2-ethyl-3-methylglutaraldehyde; 2-methylglutaraldehyde; 2-methyl-3-propylglutaraldehyde; 2-ethyl-3-propylglutaraldehyde; 2-methyl-4-ethylglutaraldehyde; 2-methyl-4-propylglutaraldehyde and the like. For convenience the invention is described and illustrated herein principally in terms of glutaraldehyde and its conversion to glutaric acid, but the invention is in no way limited to less than what is claimed.

Usually it is desirable to separate the glutaric acid from the crude oxidation product of the reaction. This is preferably done by processing the oxidation product in such a manner as to obtain a derivative of the glutaric acid which may be further purified by distillation. A suitable derivative is the anhydride of the glutaric acid which is distillable in vacuo. The conversion of glutaric acid or of a substituted glutaric acid to the corresponding anhydride may be accomplished in the following manner. The reaction product containing the glutaric acid and the lower aliphatic mono-carboxylic acid is first freed of any water by distillation with or without an added inert entrainer, or by any other method common for such purposes, as by treatment with a suitable solid drying agent such as sodium sulfate, calcium sulfate or the like. The dried product is then admixed with at least one mol of a lower aliphatic mono-carboxylic acid anhydride, per mol of contained glutaric acid, and the mixture is then heated to reaction temperature. The acid anhydride used should be the anhydride of the lower aliphatic mono-carboxylic acid employed in the original reaction mixture. By the same reaction an amount of the lower aliphatic mono-carboxylic acid anhydride equivalent to the quantity of glutaric acid reacted is converted to the corresponding lower aliphatic mono-carboxylic acid. The reaction is reversible and the conversion of the glutaric acid to the corresponding anhydride can be forced to completion by conventional expedients employed in such circumstances, as by removal of one of the products, in this case the mono-carboxylic acid. A catalytic amount of a mineral acid or other strong acid may be added to speed up the reaction.

The lower aliphatic mono-carboxylic acid anhydride used to convert the glutaric acid to the corresponding glutaric anhydride should always be the anhydride of the lower aliphatic mono-carboxylic acid used as solvent in the original oxidation reaction. When our preferred solvent acetic acid is used in the original oxidation, then acetic anhydride should be used for the conversion. Other lower aliphatic mono-carboxylic acid anhydrides such as propionic anhydride and butyric anhydride may be used when the corresponding acid has been used as the solvent in the original oxidation reaction. If it is desired to employ for the conversion the anhydride of a different acid from that used in the original oxidation, it will be necessary to remove all of the lower aliphatic mono-carboxylic acid remaining in the oxidation reaction product mixture before adding the anhydride of the different acid for the conversion.

The temperature at which the reaction proceeds is not narrowly critical. At temperatures of 50° C. and below, however, the reaction rate is so slow that the process is not feasible, even in the presence of a mineral acid catalyst. On the other hand, at temperatures above 250° C. there is a tendency for tarry by-products to form as a result of decomposition of the glutaric acid.

The ratio of mono-carboxylic acid anhydride to glutaric acid in the reaction zone can be varied from 1 to 10 moles of anhydride per mole of the glutaric acid. Below a ratio of 1 there is not enough of the anhydride to effect cyclization of all of the glutaric acid. Ratios higher than 10 mols of the anhydride increase the volume of the reaction mixture too much without a significant increase in the reaction rate.

The reaction can be carried out conveniently in a reactor provided with a reflux condenser and fractionating column maintained at a temperature which will permit the vapors of the mono-carboxylic acid to pass through while condensing and returning to the reaction vessel the glutaric acid, the mono-carboxylic acid anhydride, and the glutaric anhydride. Upon the completion of the reaction, the glutaric anhydride can be separated and purified by distillation.

The conversion of the glutaric acid to the corresponding anhydride can also be effected without employing a lower aliphatic mono-carboxylic acid anhydride. In this alternate method there is added to crude oxidation reaction product mixture a catalytic amount of a mineral acid or other strong acid, and an inert organic compound which entrains the water by forming an azeotrope with it. The mixture is then dehydrated by azeotropic distillation which first removes any water contained in the original mixture and then removes the water formed by dehydration of the glutaric acid to form the anhydride. Suitable catalysts include such strong acids as sulfuric acid, benzene sulfonic acid and the like. Organic compounds which may be employed as entraining agents include benzene, diisopropyl ether, ethylene dichloride and the like.

For many applications it will be desirable to employ the purified glutaric anhydride directly as such. Where the actual glutaric acid is desired, however, it may be readily obtained from the anhydride by hydrolysis. To regenerate the acid the purified anhydride is hydrolyzed, using at least one mol of water per mol of anhydride. At least one mol must be used for complete conversion of the anhydride. An excess of water may be used and is desirable, but inasmuch as excess water must be removed from the acid it is undesirable to use a large excess when working with acids having a high solubility in water, such as glutaric acid and the lower alkyl-substituted glutaric acids. The temperature range for the hydrolysis is from about 20° to about 150° C. If desired a catalytic amount of a mineral acid may be added to speed up the reaction. An inert organic mutual solvent may also be employed if desired. Excess water is removed by conventional means such as solid drying agents or by azeotropic distillation with an inert solvent such as benzene, toluene or the like. Also, the crystalline glutaric acid may be separated from the excess water by filtration or other mechanical means, and the mother liquor resulting then recycled or otherwise treated to recover the glutaric acid remaining therein.

If the desired end product is a distillable ester of the glutaric acid, the crude oxidation reaction product may be used without purification. The crude oxidation reaction product is first dehydrated and then the aliphatic mono-carboxylic acid contained therein is recovered by distillation. An esterification catalyst and an excess of the desired alkyl alcohol are then added to the residual crude glutaric acid. The esterification is carried out in the conventional manner. The water of esterification is removed azeotropically, using as the water entraining azeotroping agent either the excess alcohol itself or a suitable inert solvent such as benzene or the like. Upon completion of the esterification the dialkyl glutarate product can be separated and purified by distillation.

The following examples are illustrative of the invention, but do not limit the invention to less than what is claimed.

*Example I*

The apparatus comprised a creased glass kettle with a sintered-glass diffuser fitted near the bottom. A thermometer was placed in the kettle to measure the internal reactor temperature. The kettle was vented through a gas-flow indicator. Agitation was furnished by a motor-driven propeller-type stirrer. The reaction kettle was immersed in a water bath to control the reaction temperature.

To the kettle was charged 259 grams of refined 3-methylglutaraldehyde, 420 grams of glacial acetic acid, 1.5 grams of cobalt acetate tetrahydrate and 0.5 gram of cupric acetate dihydrate. The stirrer was turned on and a flow of oxygen was started through the diffuser. A large excess of oxygen was added throughout the reaction and the reaction temperature was maintained between 20 and 30° C. by external cooling. The oxidation was continued for a total of 48 hours at which time an exothermic reaction was no longer observed. The flow of oxygen and the agitation were discontinued.

The product solution, weighing 697 grams, was charged to a still along with 541 grams of acetic anhydride. The still contents were heated to the boiling temperature. Acetic acid was collected at a vapor temperature of 118° C. at atmospheric pressure. When acetic acid was no longer obtained, the unreacted acetic anhydride was recovered and the pressure in the system was reduced. The distillation was continued and there was obtained first an intermediate fraction, amounting to 38 grams, and then a fraction of 3-methylglutaric anhydride. The 3-methylglutaric anhydride recovered amounting to 206 grams and having a purity of 99.5 percent, was collected at a vapor temperature of 118° C. at 2.5 mm. of mercury absolute. The anhydride represented a yield of 70.8 percent based on the starting aldehyde.

*Example II*

The apparatus and procedure were similar to those used in Example I. The charge comprised 107 grams of 94 percent 2-ethylglutaraldehyde, 300 grams of glacial acetic acid, 2 grams of cobalt acetate tetrahydrate and 1.2 grams of cupric acetate dihydrate. The reaction temperature was maintained between 20 and 30° C. The flow of oxygen and agitation were continued for a total of 30.5 hours.

The reaction product and 204 grams of acetic anhydride were charged to a still and heated to the boiling temperature. Acetic acid was removed at a vapor temperature of 118° C. at atmospheric pressure. When acetic acid was no longer obtained, the unreacted acetic anhydride was recovered and the pressure in the system was reduced. The refined 2-ethylglutaric anhydride fraction was collected at a vapor temperature of 110–113° C. at 0.5 mm. of mercury absolute pressure. The 2-ethylglutaric anhydride was of 99.9 percent purity, weighed 76 grams and represented a 68.4 percent yield based on the starting aldehyde.

*Example III*

The apparatus and procedure were similar to those used in Example I. The charge comprised 231 grams of a solution containing 87.3 percent of glutaraldehyde and 12.7 percent of acetic anhydride, 400 grams of glacial acetic acid, and 0.03 gram of cobalt acetate tetrahydrate. The reaction temperature was 50° C. and the reaction period was 4.5 hours.

The product, weighing 640 grams, and 300 grams of acetic anhydride were charged to a still and heated to the boiling temperature. Acetic acid was collected at a vapor temperature of 118° C. When acetic acid was no longer obtained, the unreacted acetic anhydride was recovered and the pressure in the system was reduced. The glutaric anhydride fraction was collected at a vapor temperature of 127° C. at 3 mm. of mercury absolute pressure. The anhydride recovered, weighing 108 grams and having a purity of 97.2 percent, represented a yield of 47.2 percent based on the starting aldehyde.

*Example IV*

The apparatus and procedure were similar to those used in Example I. The charge comprised 275 grams of crude 3-methylglutaraldehyde, 514 grams of glacial acetic acid, 1.7 grams of cobalt acetate tetrahydrate and 0.6 gram of cupric acetate dihydrate. The aldehyde employed in this experiment was obtained as a residue product and was not refined by distillation. The reaction temperature was 40° C. and the reaction period was 7 hours.

The reaction product, weighing 777 grams, and 300 grams of acetic anhydride were charged to a still and heated to the boiling temperature. Acetic acid was collected at a vapor temperature of 118° C. at atmospheric pressure. When acetic acid was no longer obtained, the unreacted acetic anhydride was recovered and the pressure in the system was reduced. The 3-methylglutaric anhydride fraction was collected at a vapor temperature of 115° C. at 2 mm. of mercury absolute. The anhydride was of 99.1 percent purity, weighed 224 grams and represented a yield of 72.5 percent based on the starting aldehyde.

*Example V*

The apparatus and procedure were similar to those used in Example I. The charge comprised 224 grams of refined 3-methylglutaraldehyde, 284 grams of acetic acid, 22 grams of acetic anhydride and 0.08 gram of ammonium metavanadate. The reaction temperature was 40° C. and the reaction period was 24 hours.

The reaction product, 519 grams, and 300 grams of acetic anhydride were charged to a still and heated to the boiling temperature. Acetic acid was removed at a vapor temperature of 118° C. at atmospheric pressure. When acetic acid was no longer obtained, the unreacted acetic anhydride was recovered and the pressure in the system was reduced. The 3-methylglutaric anhydride fraction was collected at a vapor temperature of 115° C. at 2 mm. of mercury absolute. The anhydride was of 100 percent purity, weighed 139 grams and represented a yield of 55.3 percent based on the starting aldehyde.

*Example VI*

The apparatus and procedure were similar to those used in Example I. The charge comprised 600 grams of aqueous 47.85 percent 3-methylglutaraldehyde solution, 50 grams of glacial acetic acid, 1.5 grams of cobalt acetate tetrahydrate and 0.5 gram of cupric acetate dihydrate. The reaction temperature was from 40 to 50° C. and the reaction period was 32 hours.

The product, weighing 668 grams, was charged to a still with 675 grams of butanol and 7.4 grams of concentrated sulfuric acid. The mixture was heated to the boiling temperature at atmospheric pressure, and water was removed from the heterogeneous butanol-water azeotrope thus formed at a vapor temperature of about 84° C. When water was no longer formed, the catalyst was neutralized with 16 grams of sodium carbonate. The unreacted butanol was recovered and the pressure in the system was reduced. Dibutyl 3-methylglutarate was collected at a vapor temperature of 105° C. to 106° C. at 1 mm. of mercury absolute. The ester was of 96.4 percent purity, weighed 395 grams and represented a yield of 60.8 percent based on the starting aldehyde.

*Example VII*

The apparatus and procedure were similar to those used in Example I. The charge comprised 250 grams of aqueous 46.8 percent glutaraldehyde solution, 250 grams of glacial acetic acid, 2.1 grams of cobalt acetate tetrahydrate and 1.6 grams of cupric acetate dihydrate. The reaction temperature was between 40° C. and 50° C. and the reaction period was 42 hours.

The reaction product, 497 grams, and 250 cc. of benzene were charged to a still and heated to the boiling temperature. The water was removed from the benzene-water azeotrope thus formed at a vapor temperature of about 69° C. After the contained water of the reaction product was removed, 200 grams of acetic anhydride was added to the still. The benzene was then removed from the mixture at atmospheric pressure at a vapor temperature of 80° C. After the removal of the benzene, acetic acid was collected at a vapor temperature of 118° C. at atmospheric pressure. When acetic acid was no longer obtained, the unreacted acetic anhydride was recovered and the pressure in the system was reduced. The glutaric anhydride was collected at a vapor temperature of 102° C. to 106° C. at 1.5 mm. of mercury absolute. The anhydride was of 98.5 percent purity, weighed 68 grams and represented a yield of 51.0 percent based on the starting glutaraldehyde.

*Example VIII*

The apparatus and procedure were similar to those used in Example I. The charge comprised 300 grams of aqueous 37.1 percent 3-methylglutaraldehyde solution, 300 grams of glacial acetic acid and 1.5 grams of cobalt acetate tetrahydrate. The reaction temperature was 50° C. and the oxidation period was 16 hours.

The reaction product, 620 grams, and 250 cc. of benzene containing 0.3 cc. of concentrated sulfuric acid were charged to a still and heated to the boiling temperature at atmospheric pressure. Water was removed from the benzene-water heterogeneous azeotrope thus formed. When water was no longer produced, the catalyst was neutralized with 1 gram of sodium carbonate and the benzene was removed. The acetic acid was removed from the mixture at atmospheric pressure at a vapor temperature of 118° C. The pressure in the system was reduced. The 3-methylglutaric anhydride fraction was taken at a vapor temperature of 125° C. at 3 mm. of mercury absolute. The anhydride was of 96.2 percent purity, weighed 57 grams and represented a yield of 45.7 percent based on the starting aldehyde.

What is claimed is:

1. A process for making a glutaric acid selected from the group consisting of glutaric acid and lower alkyl substituted glutaric acids, wherein the corresponding glutaraldehyde is oxidized at a temperature between 0° C. and 110° C. with molecular oxygen in a reaction mixture containing not less than 10 percent by weight of a saturated lower aliphatic mono-carboxylic acid.

2. A process for making a glutaric acid selected from the group consisting of glutaric acid and lower alkyl substituted glutaric acids, wherein the corresponding glutaraldehyde is oxidized at a temperature between 0° C. and 110° C. with molecular oxygen in a reaction mixture containing not less than 10 percent by weight of acetic acid.

3. A process for making glutaric acid wherein glutaraldehyde is oxidized at a temperature between 0° C. and 110° C. with molecular oxygen in a reaction mixture containing not less than 10 percent by weight of a saturated lower aliphatic mono-carboxylic acid.

4. A process for making a lower alkyl-substituted glutaric acid wherein a lower alkyl-substituted glutaraldehyde is oxidized at a temperature between 0° C. and 110° C. with molecular oxygen in a reaction mixture containing not less than 10 percent by weight of a saturated lower aliphatic mono-carboxylic acid.

5. A process for making a glutaric acid selected from the group consisting of glutaric acid and lower alkyl substituted glutaric acids, wherein the corresponding glutaraldehyde is oxidized at a temperature between 0° C. and 110° C. with molecular oxygen in the presence of an oxidation catalyst, and the reaction mixture contains not less than 10 percent by weight of a saturated lower aliphatic mono-carboxylic acid.

6. A process for making a glutaric acid selected from the group consisting of glutaric acid and lower alkyl substituted glutaric acids, wherein the corresponding glutaraldehyde is oxidized between 20° C. and 50° C. with molecular oxygen in the presence of an oxidation catalyst, and the reaction mixture contains between 10 and 50 percent by weight of a saturated lower aliphatic mono-carboxylic acid.

7. A process for making a glutaric acid selected from the group consisting of glutaric acid and lower alkyl substituted glutaric acids, wherein the corresponding essentially anhydrous glutaraldehyde is oxidized at a temperature between 0° C. and 110° C. with molecular oxygen in the presence of an oxidation catalyst, and the solvent of the reaction mixture comprises a saturated lower aliphatic mono-carboxylic acid.

8. A process for making a glutaric acid selected from the group consisting of glutaric acid and lower alkyl substituted glutaric acids which comprises introducing molecular oxygen into a reaction mixture comprising the corresponding glutaraldehyde, a saturated lower aliphatic mono-carboxylic acid, and a metal compound catalyst, said saturated lower aliphatic mono-carboxylic acid being not less than 10 percent by weight of said reaction mixture, and maintaining the mixture at a temperature between 0° C. and 110° C.

9. A process for making glutaric acid which comprises introducing molecular oxygen into a reaction mixture comprising glutaraldehyde, acetic acid, and a metal compound catalyst, said acetic acid being not less than 10 percent by weight of said reaction mixture, and maintaining the mixture at a temperature between 0° C. and 110° C.

10. A process for making 3-methylglutaric acid which comprises introducing molecular oxygen into a reaction mixture comprising 3-methylglutaraldehyde, acetic acid, and a metal compound catalyst, said acetic acid being not less than 10 percent by weight of said reaction mixture, and maintaining the mixture at a temperature between 0° C. and 110° C.

11. A process for making 2-ethylglutaric acid which comprises introducing molecular oxygen into a reaction mixture comprising 2-ethylglutaraldehyde, acetic acid, and a metal compound catalyst, said acetic acid being not less than 10 percent by weight of said reaction mixture, and maintaining the mixture at a temperature between 0° C. and 110° C.

12. A process for making 2,3-dimethylglutaric acid which comprises introducing molecular oxygen into a reaction mixture comprising 2,3-dimethylglutaraldehyde, acetic acid, and a metal compound catalyst, said acetic acid being not less than 10 percent by weight of said reaction mixture, and maintaining the mixture at a temperature between 0° C. and 110° C.

13. A process for making 2-ethyl-3-methylglutaric acid which comprises introducing molecular oxygen into a reaction mixture comprising 2-ethyl-3-methylglutaraldehyde, acetic acid, and a metal compound catalyst, said acetic acid being not less than 10 percent by weight of said reaction mixture, and maintaining the mixture at a temperature between 0° C. and 110° C.

References Cited in the file of this patent

UNITED STATES PATENTS

| | | |
|---|---|---|
| 1,951,789 | Mueller-Cunradi et al. | Mar. 20, 1934 |
| 2,389,950 | Bremner et al. | Nov. 27, 1945 |